United States Patent [19]

Price

[11] Patent Number: 4,914,545
[45] Date of Patent: Apr. 3, 1990

[54] CASSETTE CASE LIGHT

[76] Inventor: Randy R. Price, RR1 Box 194, Stillwater, Okla. 74074

[21] Appl. No.: 372,795

[22] Filed: Jun. 29, 1989

[51] Int. Cl.$^4$ ............................................. F21V 33/00
[52] U.S. Cl. ..................................... 362/155; 262/200
[58] Field of Search ................................ 362/155, 200

[56] References Cited

U.S. PATENT DOCUMENTS 1,985,335  12/1934  Bloss ................................... 362/155
3,937,320  2/1976  Chao et al. .......................... 362/155

*Primary Examiner*—Carroll B. Dority
*Attorney, Agent, or Firm*—Robert K. Rhea

[57] ABSTRACT

A lighting device for illuminating the titles of a plurality of cassettes stored in a container having an upwardly open lid which includes a housing, having a top opening and overall dimensions substantially equal with a cassette case, provided with a light transmitting or reflecting member vertically biased upward through the top opening of the housing when the lid of the cassette container is opened. A circuit, connected with a source of electrical energy, including a normally open switch and a lamp, energizes the lamp to illuminate the cassettes by the upward movement of the light reflecting member.

11 Claims, 2 Drawing Sheets

CASSETTE CASE LIGHT

Background Of The Invention

1. Field of the invention

This invention relates generally to battery powered flashlights and more specifically it relates to a battery powered light housed in a container substantially equal in over-all dimensions with a standard cassette carrying case.

Cassette players are commonly used in present day passenger automotive vehicles for playing tapes and it is also common practice to carry a plurality of cassettes housed in their containers in a small hand carried case. This manner of carrying cassettes functions well but during the nighttime hours it has the disadvantage that it is difficult to determine the titles of the cassettes. To select a particular cassette tape, particularly in view of the fact that the lettering on the cassette case is relatively small, inadequate lighting will, as in an automobile, prevent ease in selecting a desired cassette.

This invention overcomes this problem by providing a light for a container holding a plurality of cassette tapes in their respective containers.

2. Description of the prior art

Prior patents generally disclose small battery powered lighting devices such as are used in connection with keys to select a key for the particular door lock whether it be a car or a dwelling. Other patents disclose small lighting devices which may carried in a purse or other manually transported container for selecting one article from among a plurality of articles in the container.

This invention is distinctive over such devices by providing an automatically illuminated light transmitting or reflecting member spring elevated from the confines of its housing and which may be carried by an individual in a cassette case or container to automatically illuminate surrounding cassettes when the lid of the case or container is opened.

Summary Of The Invention

A generally rectangular housing substantially dimensioned to be equal with the overall dimensions of a cassette container is provided with a generally horizontal partition extending between its ends which supports a pair of shafts projecting through the partition and mounted at one end to one surface of a rectangular prism-type light reflecting member. Springs interposed between the light reflecting member and the partition urge the light reflecting member above the top plane of the housing and close a normally open lamp switch when an overlying cassette container lid normally biasing the reflecting member downward into the housing is lifted. Closing the container lid depresses the light reflecting member and opens the lamp switch interrupting current from a source of electrical energy within the housing. Light rays shining on the light reflecting member scatters light throughout the cassette container or case when the lid is open.

The principal object of this invention is to provide a cassette container light which may be carried in a cassette container compartment with a plurality of conventional cassettes which illuminates the surrounding cassettes upper surfaces containing indexes of titles of recordings when the cassette container lid is opened.

Description Of The Preferred Embodiments

Figure 1:
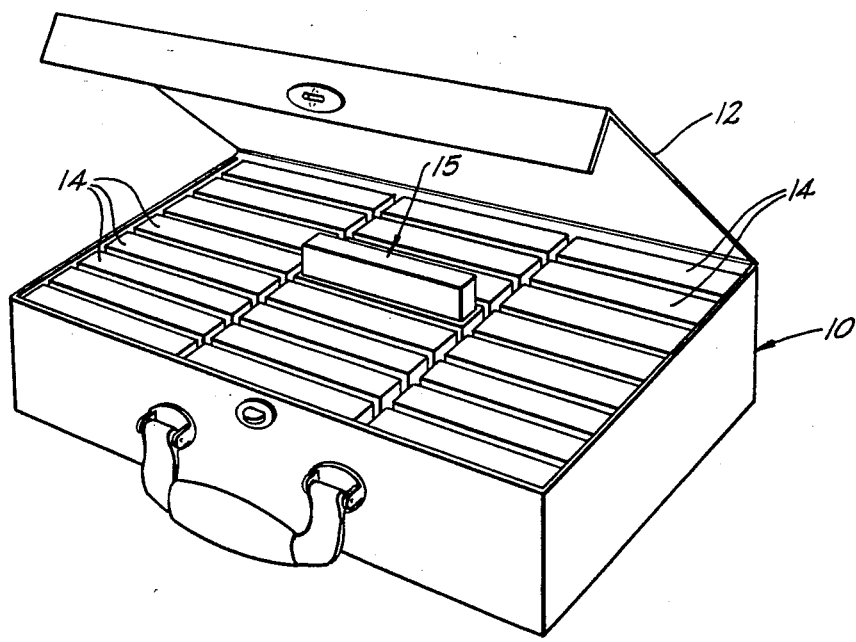
FIG. 1 is a perspective view of a conventional lid open cassette container containing a plurality of cassettes within their individual cases and illustrating the light reflecting member of the present invention in operative position.
Figure 2:
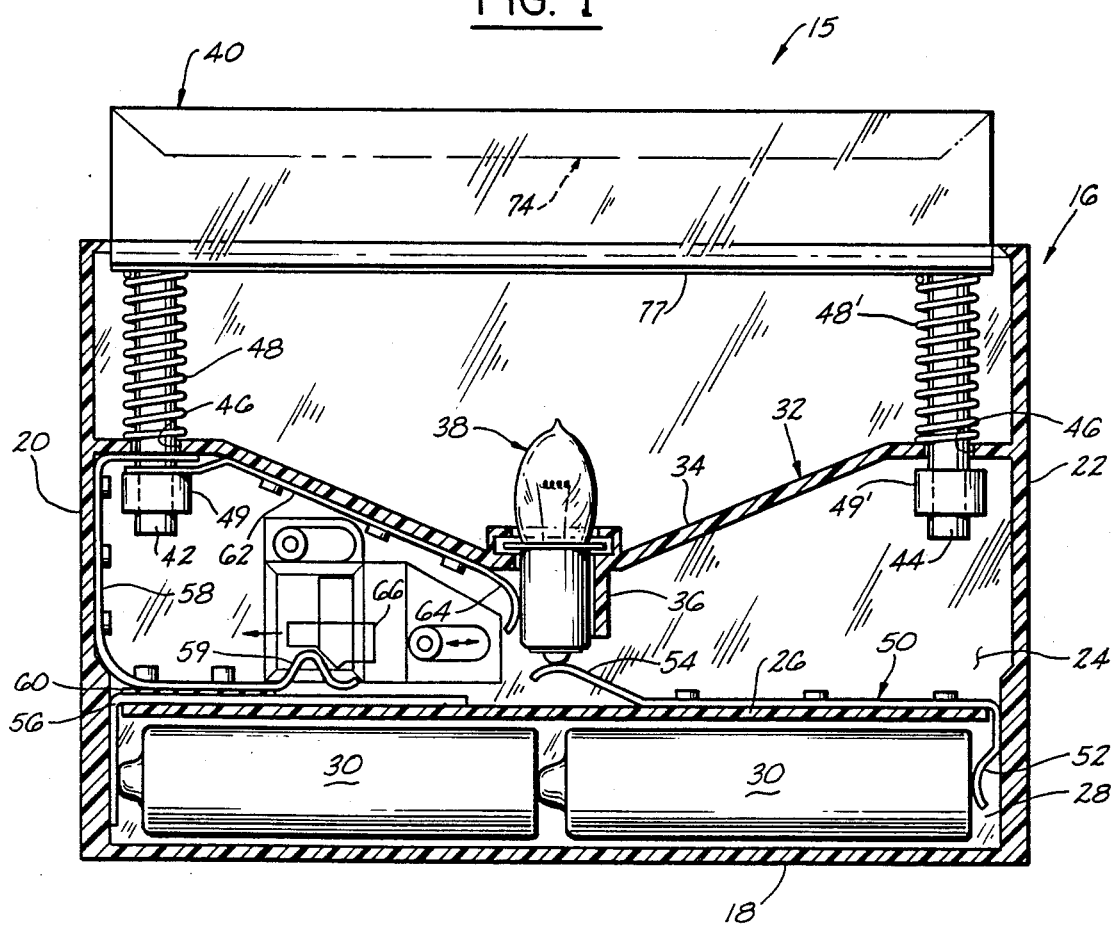
FIG. 2 is a longitudinal vertical cross-sectional view through the housing of the present invention.
Figure 3:
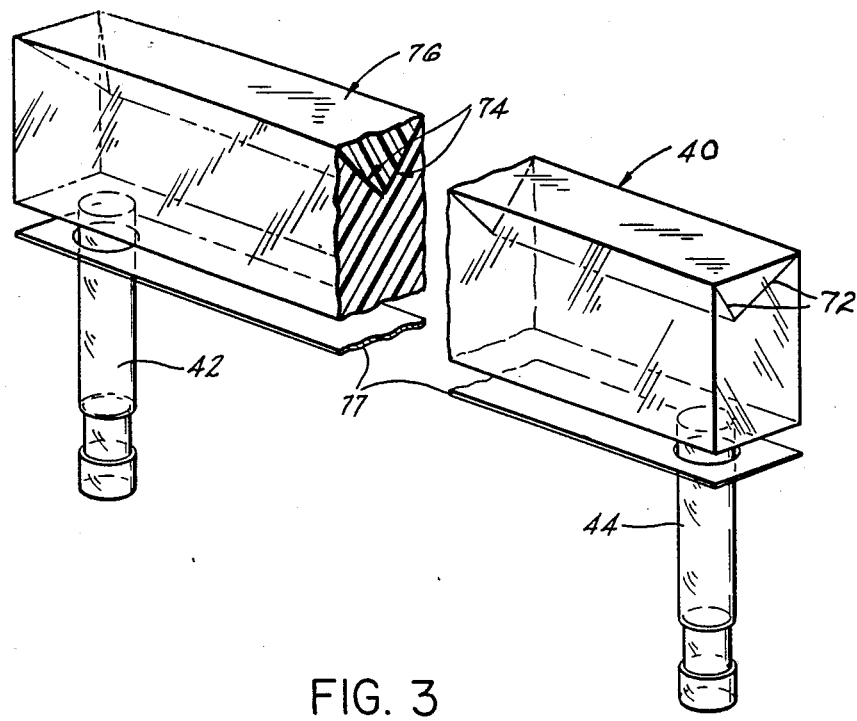
FIG. 3 is a fragmentary perspective view, partially in section, to a further enlarged scale of the light reflecting member; and,.

Like characters of reference designate like parts in those figures of the drawings in which they occur.

In the drawings:

The reference numeral 10 indicates a substantially conventional cassette carrying case comprising a generally rectangular container having an open top, opened and closed by a lid 12 hinged to one longitudinal upper edge of the container walls for vertical pivoting movement of the lid toward and away from the opposite wall for securing the lid in a closed position. The interior of the cassette container is divided by a plurality of juxtaposed relatively low upstanding partitions forming a like plurality of recesses, not shown, dimensioned for snugly receiving the depending wall portion of a like plurality of cassette cartridge containing cases 14 vertically disposed edgewise therein for transporting the cassettes in an automobile.

The reference numeral 15 indicates the device as a whole comprising a cassette case-like housing 16 rectangular in general configuration dimensioned substantially equal with respect to a standard cassette case 14. The outer wall surface of the housing 16 is readily received by within any one of the recesses nesting the cassette cases 14.

The housing 16 is formed by a bottom wall 18, opposing end walls 20 and 22 and opposing side walls 24, only one being shown. The top of the housing 16 is open for the purposes presently explained.

A partition 26 extends horizontally between the side walls 24 and end walls 20 and 22 in vertical spaced relation with respect to the bottom wall 18 to form a battery compartment 28 containing one or more series connected dry cell batteries 30 as a source of electrical energy. Intermediate its height the housing is further divided by a transverse partition 32 having a central downwardly inclined substantially V-shaped portion 34 which is centrally apertured vertically medially the length of the partition for receiving a lamp socket 36 and a direct current lamp 38 having its filament disposed upwardly.

A generally rectangular preferably transparent light reflecting or transmitting member 40, having cooperative longitudinal and transverse dimensions is freely received for vertical sliding movement in the open top of the housing 16. The member 40 is mounted, at its respective end portions, on a pair of depending elongated vertical shafts 42 and 44 which project downwardly through suitable apertures 46 formed in the transverse partition 32 adjacent its respective ends.

A pair of springs 48 and 48' surround the shafts 42 and 44, respectively, between the reflecting member 40 and the upper surface of the partition 32 for biasing the light reflecting member 40 in an upward direction. Both of the shafts 42 and 44 are provided with collars 49 and 49', respectively, on its depending end portion below the partition 32 which arrests upward movement of the light reflecting member 40 so that its depending edge portion remains within the open end portion of the housing 16.

Conductor means connect the batteries through the filament of the lamp 38 and at least one switch to excite the lamp filament when the cassette case lid 12 is opened. The conductor means comprises a negative strip 50 overlying one end portion of the partition 26 and having one end 52 in contact with the negative end of one of the batteries 30 and its opposite end portion 54 contacting one terminal of the lamp 38.

A second battery conductor 56 overlies another portion of the horizontal partition 26 and contacts the positive terminal of the other battery 30. A first intermediate conductor 58 overlies the positive terminal conductor 56 with a section of dielectric material 60 interposed therebetween and terminates at one end adjacent the under surface of the transverse partition 32 in surrounding relation with respect to the depending end portion of the shaft 42 projecting below the partition 32 to form one terminal of a normally open spring closed switch.

A second intermediate conductor strip 62 has one end apertured and surrounding the depending end portion of the shaft 42 and normally spaced downwardly with respect to the adjacent end of the terminal conductor strip 58 to form the other terminal of the normally open switch closed by the spring 48. The other end 64 of the strip 62 frictionally contacts the other terminal of the lamp 38. The first intermediate conductor strip end portion 58, opposite its end surrounding with the shaft 42, is moved toward and away from the positive conductor strip 56 by a manually operated switch 66 forming an "on-off" switch.

The top surface of the rectangllar light reflecting member 40 is longitudinally recessed to form a V-shaped void indicated by the lines 72. The surfaces of the V-shaped void or recess are coated with a layer of light reflecting material 74 and the V-shaped recess is filled with a plug 76 V-shaped in cross-section.

A relatively thin rectangular sheet of light reflecting metallic material 77 is interposed between the bottom surface of the light reflecting member 40 and the upper surface of the partition 32.

Figure 4:
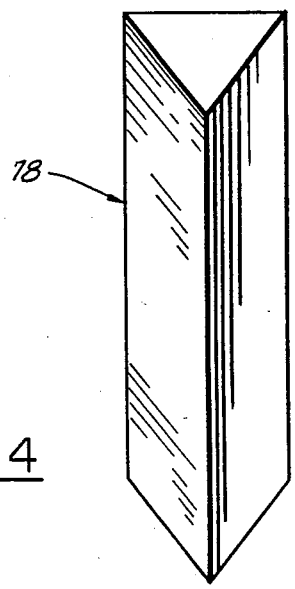
FIG. 4 is a perspective view of an alternative light reflecting member.

Obviously, a prism, such as indicated at 78 (FIG. 4, may be used in place of the light reflecting member 40, if desired.

Operation

In operation, the device is assembled as described hereinabove and, when in use, is placed within the cassette container 10 and the lid 12 is closed and fastened which depresses the member 40 and forces its shafts 42 and 44 downwardly thus opening the normally closed switch closed by the spring 48.

When it is desired to select a tape, the lid 12 is lifted and the springs 48 and 48' bias the light reflecting member vertically upward disposing its upper portion above the plane defining the top of the remaining cassettes 14 in the container 10. Upward movement of the light reflecting member, by the springs 48 and 48', closes the normally open switch which illuminates the lamp 38 and its rays shine on the light reflecting member 40. Light rays from the member 40 illuminate the cassettes 14 so that a selected cassette may be removed from the container 10.

Obviously the invention is susceptible to changes or alterations without defeating its practicability. Therefore, I do not wish to be confined to the preferred embodiment shown in the drawings and described herein.

I claim:

1. A light for a lid closed container storing a plurality of cassette tapes in individual cassette containers juxtaposed in labeled edge upright position, comprising: an upwardly open opaque wall housing cooperatively nested in juxtaposed relation within the closed container between adjacent cassette containers;

a lamp within said housing;

electrical circuit means including a normally open switch connecting a source of electrical energy with said lamp;

a light ray reflecting member vertically slidable within and normally closing the opening of said housing; and, means biasing the major portion of the reflecting member above the upper limit of the housing walls defining the housing opening and closing said normally open switch when said closed container lid is opened.

2. The light according to claim 1 in which the light ray reflecting member comprises:

a rectangular transparent bar having a top surface and having a generally V-shaped recess in its top surface defined by wall surfaces converging downwardly from the juncture of its top surface with its surrounding walls;

a sheet of light ray reflective material bonded to the walls forming the V-shape; and, a transparent plug cooperatively received by the V-shaped recess.

3. The light according to claim 2 in which the biasing means comprises:

springs underlying said bar within said housing.

4. The light according to claim 1 and further including:

a generally horizontal partition supporting said lamp.

5. The light according to claim 4 in which the light ray reflecting member comprises:

a rectangular transparent bar having opposing end and side walls and a top surface and having a generally V-shaped recess in its top surface defined by wall surfaces converging downwardly from the juncture of its top surface with its surrounding walls;

a sheet of light ray reflective material bonded to the walls forming the V-shape; and, a transparent plug cooperatively received by the V-shaped recess.

6. The light according to claim 5 in which the biasing means comprises:

springs interposed between said bar and said partition.

7. The light according to claim 5 and further including:

a shaft projecting downwardly through each end portion of the partition from respective end portions of said bar.

8. The light according to claim 7 in which the biasing means comprises:

a spring surrounding each said shaft and interposed between said bar and said partition; and, stop means on the depending end of one said shaft for limiting upward movement of said bar and closing said normally open switch.

9. A light for a lid closed container storing a plurality of cassette tapes in individual cassette containers juxtaposed in labeled edge upright position, comprising:
   an upwardly open opaque wall rectangular housing cooperatively nested in juxtaposed relation within the closed container between adjacent cassette containers;
   a lamp within said housing;
   electrical circuit means including a normally open switch connecting a source of electrical energy with said lamp;
   a prism vertically slidable within and normally closing the opening of said housing; and,
   means biasing the major portion of the prism above the upper limit of the housing walls defining the housing opening and closing said normally open switch when said closed container lid is opened.

10. The light according to claim 9 and further including:
    a shaft projecting downwardly through each end portion of the partition from respective end portions of said prism.

11. The light according to claim 10 in which the biasing means comprises:
    a spring surrounding each said shaft and interposed between said prism and said partition; and,
    stop means on the depending end of one said shaft for limiting upward movement of said prism and closing said normally open switch.

* * * * *